United States Patent
Alkan et al.

(10) Patent No.: US 12,106,193 B2
(45) Date of Patent: Oct. 1, 2024

(54) MOVING DECISION BOUNDARIES IN MACHINE LEARNING MODELS

(71) Applicant: International Business Machines Corporation, Armonk, NY (US)

(72) Inventors: Oznur Alkan, Dublin (IE); Elizabeth Daly, Dublin (IE); Rahul Nair, Dublin (IE); Massimiliano Mattetti, Dublin (IE); Dennis Wei, Sunnyvale, CA (US); Karthikeyan Natesan Ramamurthy, Pleasantville, NY (US)

(73) Assignee: International Business Machines Corporation, Armonk, NY (US)

( * ) Notice: Subject to any disclaimer, the term of this patent is extended or adjusted under 35 U.S.C. 154(b) by 771 days.

(21) Appl. No.: 17/308,310

(22) Filed: May 5, 2021

(65) Prior Publication Data
US 2022/0358397 A1    Nov. 10, 2022

(51) Int. Cl.
*G06N 20/00*  (2019.01)
*G06N 5/045*  (2023.01)

(52) U.S. Cl.
CPC ............. *G06N 20/00* (2019.01); *G06N 5/045* (2013.01)

(58) Field of Classification Search
None
See application file for complete search history.

(56) References Cited

U.S. PATENT DOCUMENTS

| | | | |
|---|---|---|---|
| 2012/0179501 A1* | 7/2012 | Beresnevichiene | G06Q 10/067 705/7.11 |
| 2017/0171580 A1* | 6/2017 | Hirsch | H04L 67/62 |
| 2019/0065939 A1* | 2/2019 | Bourgoin | G06N 3/08 |
| 2020/0394564 A1* | 12/2020 | Singh | G06N 3/08 |

FOREIGN PATENT DOCUMENTS

| | | | | |
|---|---|---|---|---|
| CN | 105373606 A | * | 3/2016 | G06K 9/6256 |
| EP | 3422262 A1 | | 1/2019 | |

OTHER PUBLICATIONS

Wikipedia, "Decision boundary", From Wikipedia, the free encyclopedia, last edited on Jan. 20, 2021, 1 page <https://en.wikipedia.org/wiki/Decision_boundary>.
Molnar, C., "4.5 Decision Rules", Interpretable Machine Learning, Jan. 25, 2021, 16 pages <https://christophm.github.io/interpretable-ml-book/rules.html>.

(Continued)

*Primary Examiner* — Xuyang Xia
(74) *Attorney, Agent, or Firm* — Yee & Associates, P.C.

(57) ABSTRACT

Embodiments are disclosed for a method. The method includes receiving feedback decision rules for multiple predictions by a trained machine learning model. generating a feedback rule set based on the feedback decision rules. The method further includes generating an updated training dataset based on an original training dataset and an updated feedback rule set. The updated feedback rule set resolves one or more conflicts of the feedback rule set, and the updated training dataset is configured to train the machine learning model to move a decision boundary. Generating the updated training dataset includes generating multiple updated training instances by applying one of the feedback decision rules to a training instance of the original training dataset.

20 Claims, 6 Drawing Sheets

(56) References Cited

OTHER PUBLICATIONS

Kohavi et al., "Adult Data Set", Machine Learning Repository, printed Jan. 28, 2021, 4 pages <https://archive.ics.uci.edu/ml/datasets/adult>.

Kamiran et al., "Data preprocessing techniques for classification without discrimination", Knowledge and Information Systems, vol. 33, No. 1, pp. 1-33, Oct. 2012.

Calmon et al., "Optimized pre-processing for discrimination prevention", In Advances in Neural Information Processing Systems (NeurIPS), 10 pages, Dec. 2017.

Chawla et al., "SMOTE: synthetic minority over-sampling technique", Journal of artificial intelligence research 16 (2002), pp. 321-357.

Han et al., "Borderline-SMOTE: a new over-sampling method in imbalanced data sets learning", International conference on intelligent computing, 2005, pp. 878-887.

Ponti, Jr., et al., "Ensembles of optimum-path forest classifiers using input data manipulation and undersampling", International Workshop on Multiple Classifier Systems, 2013, 12 pages.

Sharma et al., "Synthetic Oversampling with the Majority Class: A New Perspective on Handling Extreme Imbalance", 2018 IEEE International Conference on Data Mining, Nov. 17-20, 2018, pp. 447-456.

Hu et al., "Learning data manipulation for augmentation and weighting", 33rd Conference on Neural Information Processing Systems, 2019, 12 pages.

Kumagai et al., "Learning Dynamics of Decision Boundaries without Additional Labeled Data", Research Track Paper, KDD 2018, Aug. 19-23, 2018, 10 pages.

Kumagai et al., "Learning future classifiers without additional data", In Proceedings of the Thirtieth AAAI Conference on Artificial Intelligence (AAAI'16), Feb. 2016, Abstract Only, 3 pages.

Lindgren, T., "Methods for Rule Conflict Resolution", ECML 2004, pp. 262-273.

Huijser et al., "Active Decision Boundary Annotation with Deep Generative Models," Proceedings of the IEEE International Conference on Computer Vision, pp. 5286-5295, 2017.

Kapoor et al., "Interactive Optimization for Steering Machine Classification," Proceedings of the SIGCHI Conference on Human Factors in Computing Systems, pp. 1343-1352, Apr. 10-15, 2010.

Kapoor et al., "Performance and Preferences: Interactive Refinement of Machine Learning Procedures," AAAI, 2012, 7 pages.

Mell et al., "The NIST Definition of Cloud Computing", Recommendations of the National Institute of Standards and Technology, Sep. 2011, 7 pages.

\* cited by examiner

FIG. 6

MOVING DECISION BOUNDARIES IN MACHINE LEARNING MODELS

BACKGROUND

The present disclosure relates to machine learning models, and more specifically moving decision boundaries in machine learning models.

Machine learning models can be algorithms that perform specific classifications, also referred to herein as predictions. For example, a machine learning model can analyze pictures of dogs and wolves, and distinguish between the two classes of animal. Machine learning models can perform such classifications by mapping to a multidimensional (e.g., 3D) space, data points that represent features of the inputs. Thus, in a statistical-classification problem for two classes, a decision boundary represents a hypersurface that partitions the underlying vector space into two sets, one for each class. Accordingly, a machine learning classifier can classify all the points on one side of the decision boundary as belonging to one class and all those on the other side as belonging to the other class. Multiple decision boundaries are possible, too. In general, for multiple classes, the decision boundary is the boundary between different classes or decision regions. Accordingly, the decision boundary can represent a hypersurface that partitions the underlying picture space into two or more sets such that the class of each data point is determined by where the data point lies with respect to the decision boundary (or boundaries).

SUMMARY

Embodiments are disclosed for a method. The method includes receiving feedback decision rules for multiple predictions by a trained machine learning model. The method further includes generating a feedback rule set based on the feedback decision rules. The method further includes generating an updated training dataset based on an original training dataset and an updated feedback rule set. The updated feedback rule set resolves one or more conflicts of the feedback rule set, and the updated training dataset is configured to train the machine learning model to move a decision boundary.

Further aspects of the present disclosure are directed toward systems and computer program products with functionality similar to the functionality discussed above regarding the computer-implemented methods. The present summary is not intended to illustrate each aspect of, every implementation of, and/or every embodiment of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

While the present disclosure is amenable to various modifications and alternative forms, specifics thereof have been shown by way of example in the drawings and will be described in detail. It should be understood, however, that the intention is not to limit the present disclosure to the particular embodiments described. On the contrary, the intention is to cover all modifications, equivalents, and alternatives falling within the spirit and scope of the present disclosure.

DETAILED DESCRIPTION

As stated previously, the decision boundary can partition a set of data points into two or more sets such that the class of each data point is determined by where the data point lies with respect to the decision boundaries. However, in some scenarios, it may be useful to move decision boundaries. For example, a machine learning model trained to make decisions on loan applications may become outdated when new business rules and/or regulations in the banking and lending industries come into effect. Thus, it can be useful to retrain the model to generate new decision boundaries that accommodate the new rules and/or regulations. Rules and regulations can also affect machine learning models for claim approval in the insurance industry. Additionally, recommender systems, which can present personalized recommendations to web users for goods or information, may also vary over time because the interests of users can change dynamically. These are merely examples of machine learning models that, in various industries and applications, may benefit from changing decision boundaries over time. However, it may take time for new data that reflects the new decision rules to accumulate. Depending on the domain, it may take weeks, months or even years before enough training data can accumulate that is capable of moving the decision boundary in a machine learning model.

Another scenario that can be beneficial in moving decision boundaries is when a machine learning model learns inaccurate decision boundaries due to noisy training data. Additionally, it may be useful to change the decision boundaries of a machine learning model for bias mitigation.

Accordingly, some embodiments of the present disclosure can move the decision boundaries of a machine learning model. A decision boundary manager can take feedback responsive to predictions by the machine learning model, and generate a new training dataset. Accordingly, a client of the machine learning model can re-train the model to learn new decision boundaries using the new training dataset that is based on the feedback rules. Accordingly, some embodiments of the present disclosure can improve the efficient use of machine learning models by reducing the amount of time and other resources involved in moving decision boundaries of a trained machine learning model.

Figure 1:
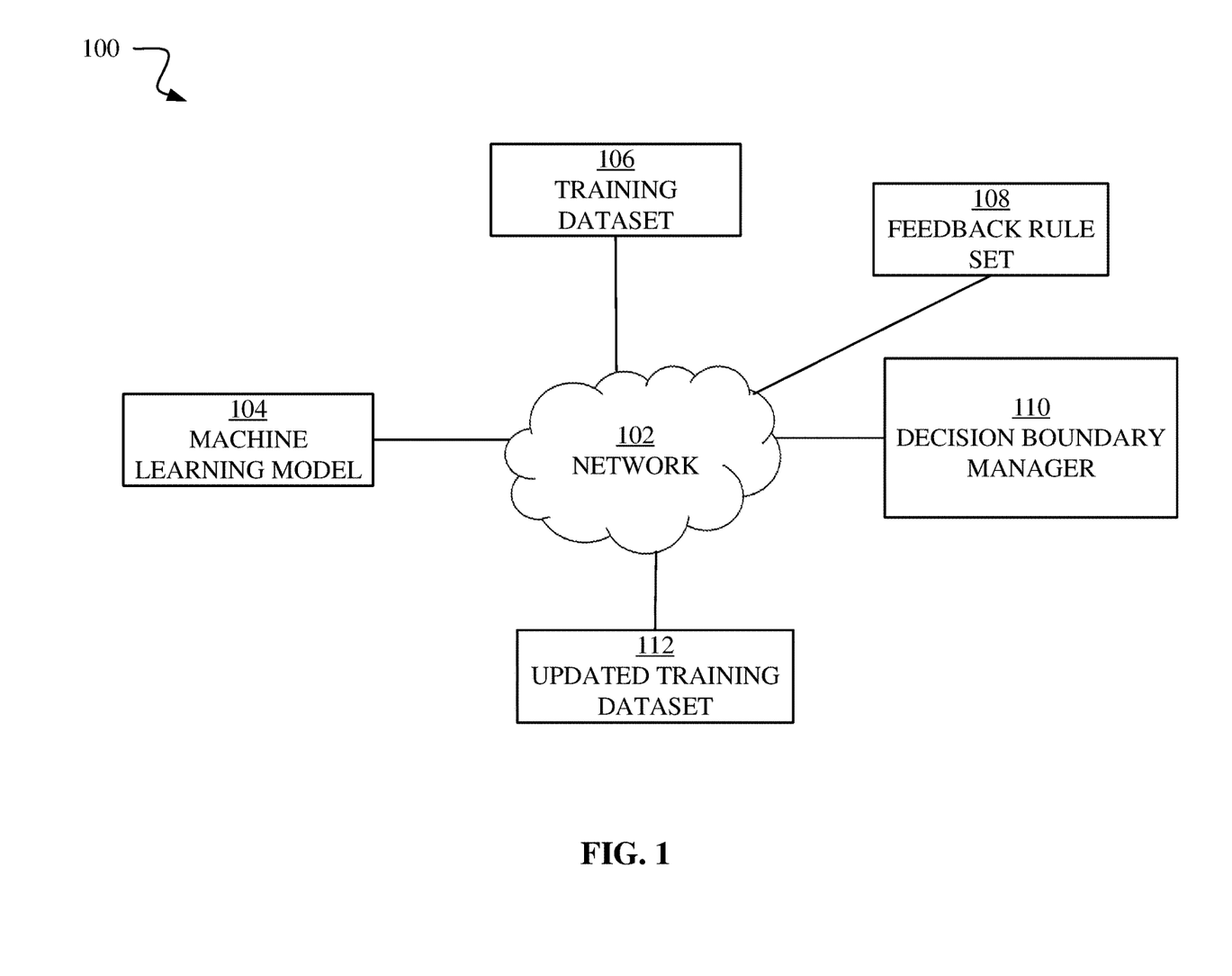
FIG. 1 is a block diagram of an example system for moving decision boundaries, in accordance with some embodiments of the present disclosure.

FIG. 1 is a block diagram of an example system 100 for moving decision boundaries, in accordance with some embodiments of the present disclosure. The system 100 includes a network 102, machine learning model 104, training dataset 106, feedback rule set 108, decision boundary manager 110, and updated training dataset 112. The network 102 may be a local area network, wide area network, or collection of computer communication networks that facilitates communication between components of the system 100, specifically, between the machine learning model 104, training dataset 106, feedback rule set 108, decision boundary manager 110, and updated training dataset 112. In some embodiments, the network 102 can be the Internet.

Machine learning is a form of artificial intelligence that enables a system to learn from data rather than through explicit programming. Accordingly, the machine learning model 104 can be an algorithm trained to make a particular classification, or prediction. The machine learning model 104 is trained by performing classifications with the training dataset 106. The training dataset 106 can include batches of records that the machine learning model 104 attempts to classify. Additionally, the training dataset 106 can include labels that indicate the correct classifications. In this way, the machine learning model 104 can determine when classifications are correct and try to learn, i.e., improve, the classification. As stated previously, the decision boundaries of a trained model can become outdated. However, re-training such a model can take relatively long periods of time, and can be relatively resource intensive. Accordingly, in some embodiments of the present disclosure, the machine learning model 104 can represent an untrained model making classifications according to the same underlying algorithm as the trained model. Further, the machine learning model 104 can be trained to learn new decision boundaries based on the feedback rule set 108.

The feedback rule set 108 can include a set of rules for determining the classification of instances in the training dataset 106. An instance can represent one row, or record, in the training dataset 106. Further, each rule, R, in feedback rule set 108 can be in the form of a decision rule. A decision rule can identify a condition, or antecedent, and a resulting prediction. For example, the decision rule can be a simple IF-THEN statement, indicating that "IF" the condition(s) are met, "THEN" the machine learning model 104 makes the prediction indicated. The rules can be based on feedback to the machine learning model's classifications. Such feedback can come from clients of the machine learning model 104 and/or a bias detection algorithm. A bias detection algorithm may identify bias in the machine learning model's classifications (and/or the explanations of the classifications). Explanations of classifications can indicate the parameters and values from the training dataset 106 that are determinative for the machine learning model 104 in making classifications. The feedback can indicate when a classification is incorrect and provide the correct classification. Alternatively, feedback can specify a decision rule with a correction. For example, the clients of a bias mitigation algorithm can provide feedback in the form of decision rules configured to move decision boundaries in order to resolve identified bias.

According to some embodiments of the present disclosure, the decision boundary manager 110 can move decision boundaries in the machine learning model 104 based on the feedback rule set 108. As stated previously, moving the decision boundary can mean training the machine learning model 104 to re-learn classification decisions. More specifically, the decision boundary manager 110 can use the feedback rule set 108 and the training dataset 106 to generate the updated training dataset 112. The updated training dataset 112 can include updated records from the training dataset 106. The updated records can include updated classifications as determined by the feedback rule set 108. Thus, if feedback indicates a new classification for a specific record from the training dataset 106, the updated training dataset 112 can include the record with the new classification. However, if feedback indicates a decision rule, the decision boundary manager 110 can generate new training records in the updated training dataset 112 that test the decision rule.

Accordingly, the machine learning model 104 can train on the updated training dataset 112 such that machine learning model 104 learns to change the classification for that record. In this way, the decision boundary manager 110 can help move the decision boundaries of the machine learning model 104.

Figure 2:
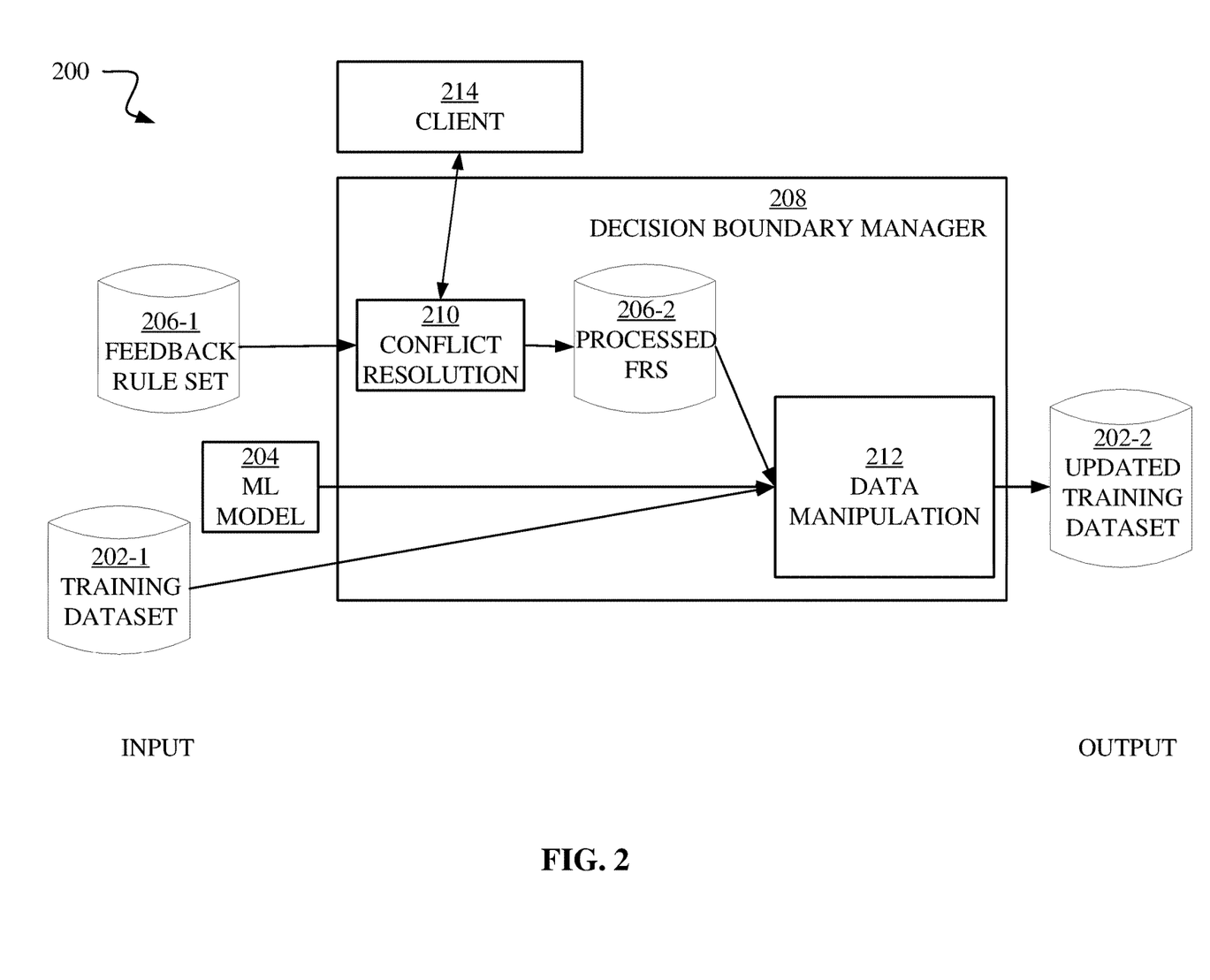
FIG. 2 is an example system for moving decision boundaries, in accordance with some embodiments of the present disclosure.

FIG. 2 is a block diagram of an example system 200 for moving decision boundaries, in accordance with some embodiments of the present disclosure. The system 200 includes a training dataset (D) 202-1, machine learning model 204, feedback rule set (FRS) 206-1, decision boundary manager 208, updated training dataset (D') 202-2, and a client of the machine learning model (client) 214. The training dataset 202-1, machine learning model 204, FRS 206-1, decision boundary manager 208, and updated training dataset 202-2 can be respectively similar to the training dataset 106, machine learning model 104, feedback rule set 108, decision boundary manager 110, and updated training dataset 112, described with respect to FIG. 1. Additionally, the lines from the training dataset 202-1, machine learning model 204 and FRS 206-1 to the decision boundary manager 208 indicating these are inputs to the decision boundary manager 208. Similarly, the line from the decision boundary manager 208 to the updated training dataset 202-2 indicates this is the output of the decision boundary manager 208.

More specifically, the FRS 206-1 can be input to the decision boundary manager 208, which includes a process for conflict resolution 210, processed FRS 206-2, and a process for data manipulation 212. The arrow from the FRS 206-1 to the conflict resolution 210 indicates the FRS 206-1 is input to the conflict resolution 210. The line from the client 214 to the conflict resolution 210 may indicate that the client 214 performs the conflict resolution 210 in a manual and/or interactive process, which can resolve conflicts in the FRS 206-1. Resolving conflicts in this way can help ensure that the same records (populations) in the training dataset 202-1 do not map to different target classes. Accordingly, the conflict resolution 210 can detect and resolve conflicts manually using established techniques such as, naïve Bayes classification, intersecting rules, double induction, recursive induction, and the like. These techniques may update and/or delete conflicting rules of the FRS 206-1. The arrow from the conflict resolution 210 to the processed FRS 206-2 indicates that the processed FRS 206-2 is an output of the conflict resolution 210. Accordingly, the processed FRS 206-2 can represent the updated rules from the FRS 206-1 after resolving conflicts.

The data manipulation 212 can generate the updated training dataset 202-2 by applying the processed FRS 206-2 to the training dataset 202-1. Additionally, the data manipulation 212 can generate new records in the updated training dataset 202-2 by oversampling data in the training dataset 202-1 that is at the border and/or boundary represented by the rules in the processed FRS 206-2. Further, the data manipulation 212 can create neighboring instances for the oversampled training data in the updated training dataset 202-2. If no such boundary instances exist (or the population is relatively small), the data manipulation 212 can relax the boundary conditions by removing one or more predicates.

In an example, a client of the machine learning model 204 may observe the prediction class for an instance, d. In this example, the instance d can include information relevant to a prediction about an individual's income, such as age (a), education (b), and capital gain (c). Accordingly, the machine learning model 204 can predict for instance d, whether the individual has an income level less than a predetermined threshold. However, the client can be a data science expert, and provide feedback based on the prediction class output from the machine learning model 204 for a data instance. The client and/or expert may have some predefined rules learned from experience, or have knowledge of regulations that apply to one or more populations. The predefined rules may not be specific to an instance-level. Thus, a subset of variables of the domain may fulfill the feedback rule. For example, the expert can know a predefined rule that if the age is greater or equal to a, and the education is b or greater, the predicted class is an income greater than the predetermined threshold. The decision boundary manager 208 can thus generate a rule in the processed FRS 206-2 that indicates the prediction for the population represented by the expert's feedback.

In another example, the machine learning model 204 can provide an explanation for the instance, d, prediction. More specifically, the explanation can indicate a predicted income below the predetermined threshold if the age is less than or equal to a, and the capital gains are less than c+m. The expert can thus provide feedback on the explanation by updating the capital gain equation. More specifically, the expert can provide a decision rule stating that if the age is less than or equal to a, and the capital gain is less than c−m, the predicted class is an income less than the predetermined threshold.

In this way, the decision boundary manager 208 can improve the alignment between the machine learning model 204 and the feedback rule set 206. Accordingly, the decision boundary manager 208 can split the updated training dataset 202-2 into a training dataset and test dataset (not shown), with which the machine learning model 204 can be trained and tested, respectively. In this context, testing can include checking the predictions assigned by the machine learning model against the test data.

According to some embodiments of the present disclosure, the decision boundary manager 208 can populate the updated training dataset 202-2 to include populations of instances satisfying the predicates of each decision rule, R, in the FRS 206-2 (population S). Additionally, the decision boundary manager 208 can populate the update training dataset 202-2 to include populations of instances that satisfy the prediction classes of R (population SM). Further, the decision boundary manager 208 can populate to meet or exceed a threshold accuracy, wherein the accuracy is determined by dividing the number of instances in SM by the number of instances in S.

Figure 3:
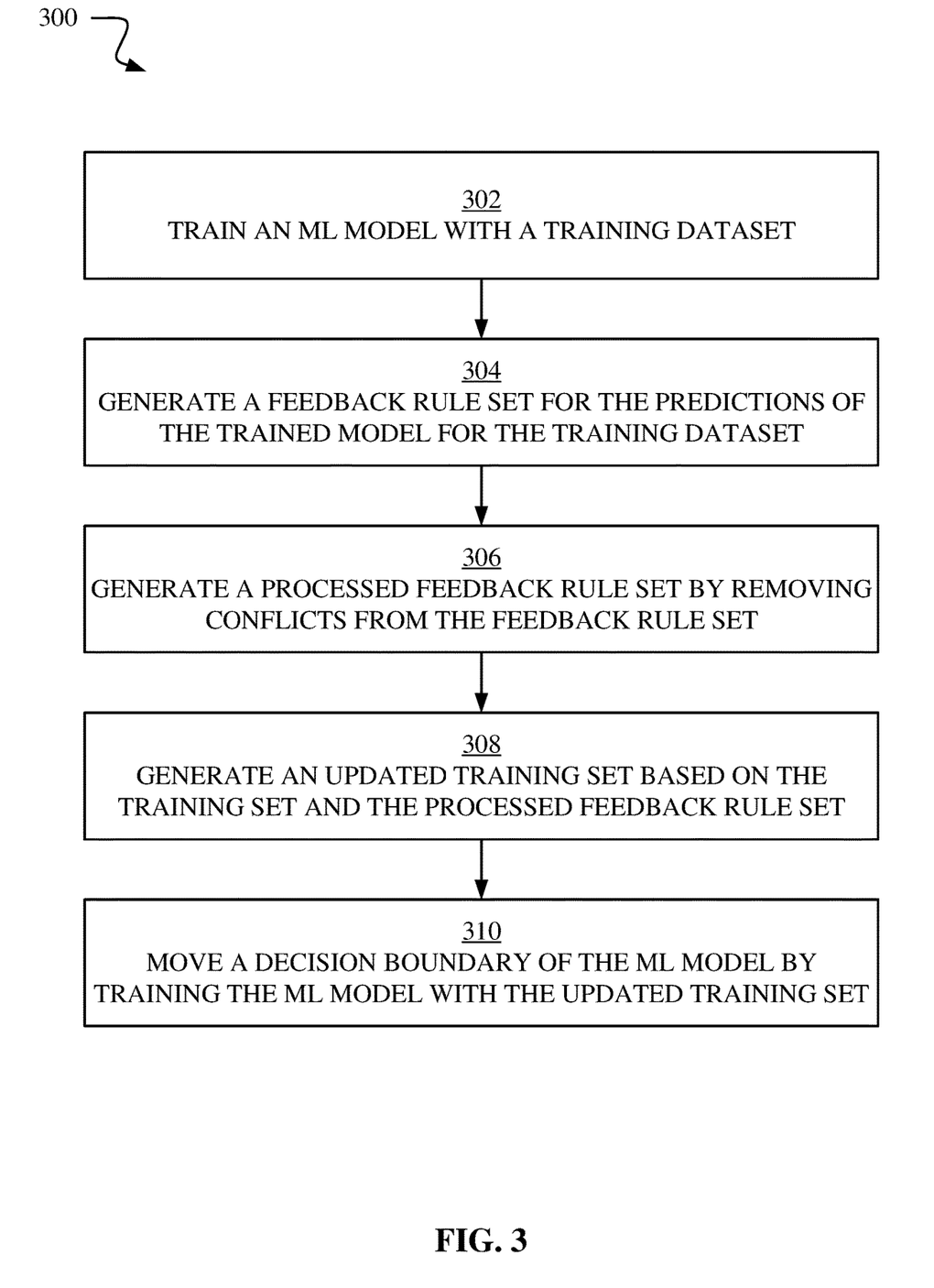
FIG. 3 is a process flow chart of an example method for moving decision boundaries, in accordance with some embodiments of the present disclosure.

FIG. 3 is a process flow chart of an example method 300 for moving decision boundaries, in accordance with some embodiments of the present disclosure. A decision boundary manager, such as the decision boundary managers 110, 208, and a client of the machine learning model, such as the client 214 of the machine learning model 204, can perform the method 300.

At operation 302, the client 214 can train the machine learning model 204 using a training dataset, such as the training dataset 202-1. Training the machine learning model 204 in this way can teach the machine learning model 204 an outdated decision boundary.

Accordingly, at operation 304, the decision boundary manager 208 can generate a feedback rule set, such as the FRS 206-1 for the predictions of the machine learning model 204. The feedback can be similar to the FRS 108, mapping a predicate to a prediction. The predicate can specify values for variables associated with an instance for the machine learning model 104. In this way, the predicate can identify a population of potential instances for the machine learning model 104. Additionally, the feedback can indicate a movement of one or more decision boundaries for the machine learning model 204.

At operation 306, the client 214 can generate a processed FRS, such as the processed FRS 206-2, by resolving conflicts of the feedback rule set 206-1. As stated previously, a conflict resolution process, such as the conflict resolution 210, can update and/or remove conflicting rules of the FRS 206-1. In this way, embodiments of the present disclosure can prevent scenarios where members of the same population of instances (identified in a rule of the processed FRS 206-2) map to different prediction classes.

At operation 308, the decision boundary manager 208 can generate an updated training dataset, such as the updated training dataset 202-2, based on the training dataset 202-1 and the processed FRS 206-2. The updated training dataset 202-2 can include samplings from the training dataset 202-1 that meet boundary conditions identified in the FRS 206-2. Additionally, the predictions for these sampled instances can be based on the associated rule of the FRS 206-2. Further, the decision boundary manager 208 can generate new instances for the updated training dataset 202-2 that are based on the rules in the FRS 206-2. More specifically, the decision boundary manager 208 can identify populations based on the predicate conditions of the rule. In this way, the decision boundary manager 208 can supplement the updated training dataset 202-2 with additional instances. Adding volume to the updated training dataset 202-2 in this way can help improve the effectiveness of re-training the machine learning model 204 to move decision boundaries.

At operation 310, the client 214 can move a decision boundary by re-training the machine learning model 204 with the updated training dataset 202-2. As stated previously, the updated training dataset 202-2 can be configured to teach the machine learning model 204 to map relevant instances to the new decision boundary. In this way, the machine learning model 204 learns to move the decision boundary.

Advantageously, the decision boundary manager 208 can be useful in any domain where a machine learning solution is in place. Accordingly, the decision boundary manager 208 can help organizations use their existing data to leverage the benefits and strengths of machine learning solutions while supporting and conforming to business rules or constraints such as, changes in decision making criteria, updates to regulatory or policy rules, and mitigation against bias.

Figure 4:
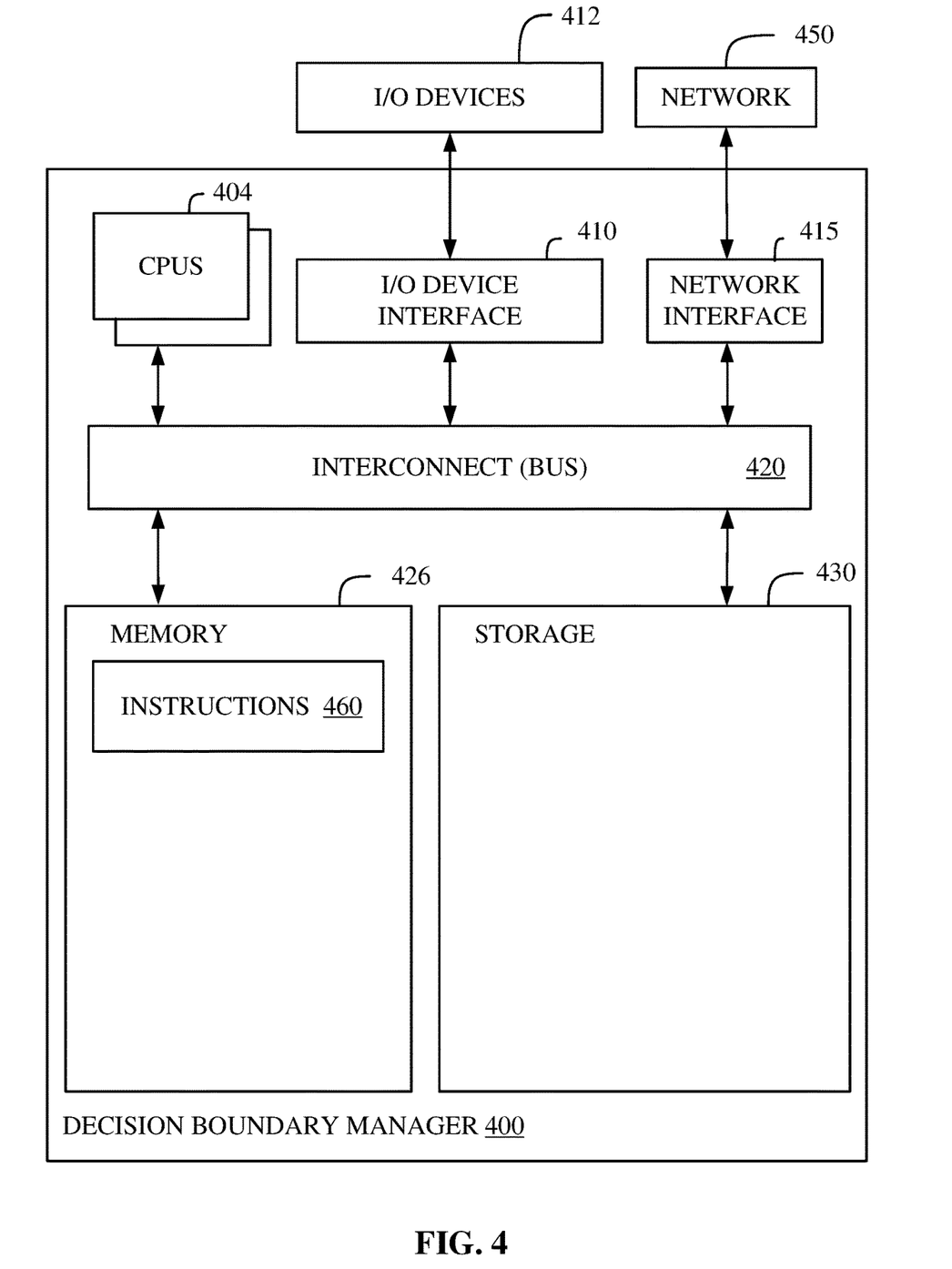
FIG. 4 is a block diagram of an example decision boundary manager, in accordance with some embodiments of the present disclosure.

FIG. 4 is a block diagram of an example decision boundary manager 400, in accordance with some embodiments of the present disclosure. In various embodiments, the decision boundary manager 400 is similar to the decision boundary manager 110, and can perform the method described in FIG. 3 and/or the functionality discussed in FIGS. 1 and 2. In some embodiments, the decision boundary manager 400 provides instructions for the aforementioned methods and/or functionalities to a client machine such that the client machine executes the method, or a portion of the method, based on the instructions provided by the decision boundary manager 400. In some embodiments, the decision boundary manager 400 comprises software executing on hardware incorporated into a plurality of devices.

The decision boundary manager 400 includes a memory 425, storage 430, an interconnect (e.g., BUS) 420, one or more CPUs 405 (also referred to as processors 405 herein), an I/O device interface 410, I/O devices 412, and a network interface 415.

Each CPU 405 retrieves and executes programming instructions stored in the memory 425 or the storage 430. The interconnect 420 is used to move data, such as programming instructions, between the CPUs 405, I/O device interface 410, storage 430, network interface 415, and memory 425. The interconnect 420 can be implemented using one or more busses. The CPUs 405 can be a single CPU, multiple CPUs, or a single CPU having multiple processing cores in various embodiments. In some embodiments, a CPU 405 can be a digital signal processor (DSP). In some embodiments, CPU 405 includes one or more 3D integrated circuits (3DICs) (e.g., 3D wafer-level packaging (3DWLP), 3D interposer based integration, 3D stacked ICs (3D-SICs), monolithic 3D ICs, 3D heterogeneous integration, 3D system in package (3DSiP), and/or package on package (PoP) CPU configurations). Memory 425 is generally included to be representative of a random access memory (e.g., static random access memory (SRAM), dynamic random access memory (DRAM), or Flash). The storage 430 is generally included to be representative of a non-volatile memory, such as a hard disk drive, solid state device (SSD), removable memory cards, optical storage, and/or flash memory devices. Additionally, the storage 430 can include storage area-network (SAN) devices, the cloud, or other devices connected to the decision boundary manager 400 via the I/O device interface 410 or to a network 450 via the network interface 415.

In some embodiments, the memory 425 stores instructions 460. However, in various embodiments, the instructions 460 are stored partially in memory 425 and partially in storage 430, or they are stored entirely in memory 425 or entirely in storage 430, or they are accessed over a network 450 via the network interface 415.

Instructions 460 can be processor-executable instructions for performing any portion of, or all, any of the methods described in FIG. 3 and/or the functionality discussed in FIGS. 1 and 2.

In various embodiments, the I/O devices 412 include an interface capable of presenting information and receiving input. For example, I/O devices 412 can present information to a listener interacting with decision boundary manager 400 and receive input from the listener.

The decision boundary manager 400 is connected to the network 450 via the network interface 415. Network 450 can comprise a physical, wireless, cellular, or different network.

In some embodiments, the decision boundary manager 400 can be a multi-user mainframe computer system, a single-user system, or a server computer or similar device that has little or no direct user interface but receives requests from other computer systems (clients). Further, in some embodiments, the decision boundary manager 400 can be implemented as a desktop computer, portable computer, laptop or notebook computer, tablet computer, pocket computer, telephone, smart phone, network switches or routers, or any other appropriate type of electronic device.

It is noted that FIG. 4 is intended to depict the representative major components of an exemplary decision boundary manager 400. In some embodiments, however, individual components can have greater or lesser complexity than as represented in FIG. 4, components other than or in addition to those shown in FIG. 4 can be present, and the number, type, and configuration of such components can vary.

Although this disclosure includes a detailed description on cloud computing, implementation of the teachings recited herein are not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model can include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but can be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It can be managed by the organization or a third-party and can exist on-premises or off-premises.

Community cloud: the cloud infrastructure is shared by several organizations and supports a specific community that has shared concerns (e.g., mission, security requirements, policy, and compliance considerations). It can be managed by the organizations or a third-party and can exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 5:
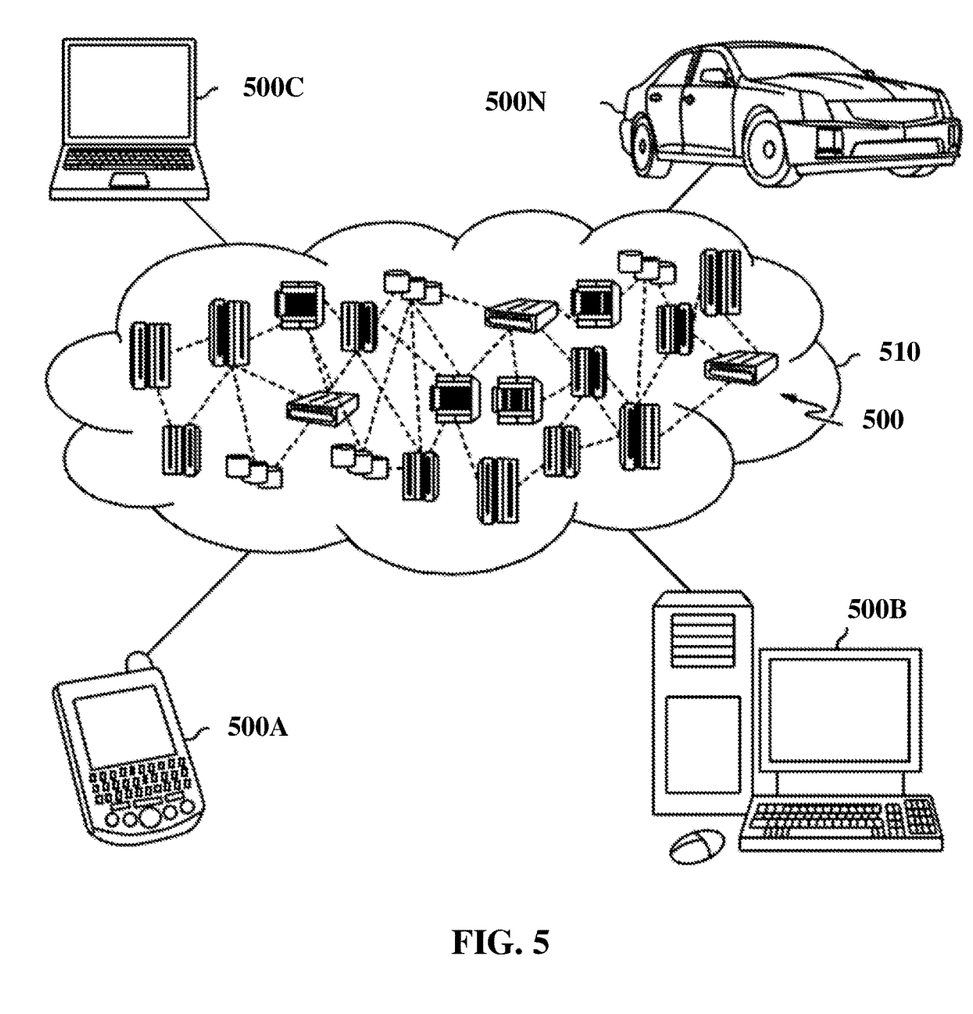
FIG. 5 is a cloud computing environment, in accordance with some embodiments of the present disclosure.

FIG. 5 is a cloud computing environment 510, according to some embodiments of the present disclosure. As shown, cloud computing environment 510 includes one or more cloud computing nodes 500. The cloud computing nodes 500 can perform the method described in FIG. 3 and/or the functionality discussed in FIGS. 1 and 2. Additionally, cloud computing nodes 500 can communicate with local computing devices used by cloud consumers, such as, for example, personal digital assistant (PDA) or cellular telephone 500A, desktop computer 500B, laptop computer 500C, and/or automobile computer system 500N. Further, the cloud computing nodes 500 can communicate with one another. The cloud computing nodes 500 can also be grouped (not shown) physically or virtually, in one or more networks, such as Private, Community, Public, or Hybrid clouds as described hereinabove, or a combination thereof. This allows cloud computing environment 510 to offer infrastructure, platforms and/or software as services for which a cloud consumer does not need to maintain resources on a local computing device. It is understood that the types of computing devices 500A-N shown in FIG. 5 are intended to be illustrative only and that computing nodes 500 and cloud computing environment 510 can communicate with any type of computerized device over any type of network and/or network addressable connection (e.g., using a web browser).

Figure 6:
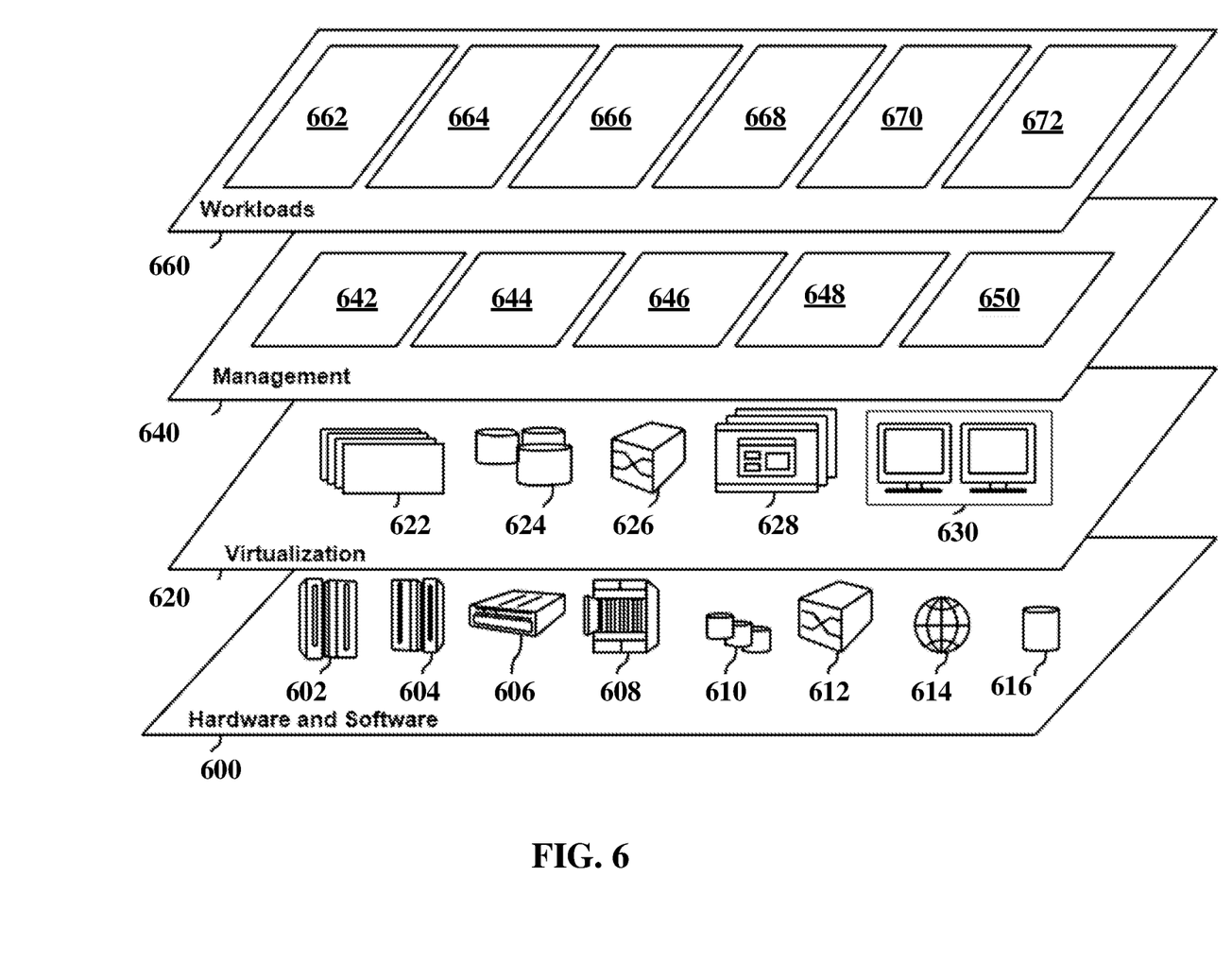
FIG. 6 is a set of functional abstraction model layers provided by the cloud computing environment, in accordance with some embodiments of the present disclosure.

FIG. 6 is a set of functional abstraction model layers provided by cloud computing environment 510 (FIG. 5), according to some embodiments of the present disclosure. It should be understood in advance that the components, layers, and functions shown in FIG. 6 are intended to be illustrative only and embodiments of the disclosure are not limited thereto. As depicted below, the following layers and corresponding functions are provided.

Hardware and software layer 600 includes hardware and software components. Examples of hardware components include: mainframes 602; RISC (Reduced Instruction Set Computer) architecture based servers 604; servers 606; blade servers 608; storage devices 610; and networks and networking components 612. In some embodiments, software components include network application server software 614 and database software 616.

Virtualization layer 620 provides an abstraction layer from which the following examples of virtual entities can be provided: virtual servers 622; virtual storage 624; virtual networks 626, including virtual private networks; virtual applications and operating systems 628; and virtual clients 630.

In one example, management layer 640 can provide the functions described below. Resource provisioning 642 provides dynamic procurement of computing resources and other resources that are utilized to perform tasks within the cloud computing environment. Metering and Pricing 644 provide cost tracking as resources are utilized within the cloud computing environment, and billing or invoicing for consumption of these resources. In one example, these resources can include application software licenses. Security provides identity verification for cloud consumers and tasks, as well as protection for data and other resources. User portal 646 provides access to the cloud computing environment for consumers and system administrators. Service level management 648 provides cloud computing resource allocation and management such that required service levels are met. Service level management 648 can allocate suitable processing power and memory to process static sensor data. Service Level Agreement (SLA) planning and fulfillment 650 provide pre-arrangement for, and procurement of, cloud computing resources for which a future requirement is anticipated in accordance with an SLA.

Workloads layer 660 provides examples of functionality for which the cloud computing environment can be utilized. Examples of workloads and functions which can be provided from this layer include: mapping and navigation 662; software development and lifecycle management 664; virtual classroom education delivery 666; data analytics processing 668; transaction processing 670; and decision boundary manager 672.

The present disclosure may be a system, a method, and/or a computer program product at any possible technical detail level of integration. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, Java, Python or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A system comprising:
   one or more computer processing circuits; and
   one or more computer-readable storage media storing program instructions which, when executed by the one or more computer processing circuits, are configured to cause the one or more computer processing circuits to perform a method comprising:
      receiving a plurality of feedback decision rules for determining classifications of instances in an original training dataset for a plurality of predictions made by a trained machine learning model;
      generating a feedback rule set based on the plurality of feedback decision rules;
      generating an updated feedback rule set by modifying one or more conflicting rules in the feedback rule set to ensure same record in the original training dataset do not map to different target classes;
      generating an updated training dataset by applying the updated feedback rule set to the original training dataset; and
      retraining the trained machine learning model using the updated training dataset to move a decision boundary in the trained machine learning model for future classification tasks.

2. The system of claim 1, wherein generating the updated training dataset comprises generating a plurality of updated training instances by applying one of the feedback decision rules to a training instance of the original training dataset.

3. The system of claim 1, wherein generating the updated training dataset comprises oversampling a plurality of training instances from the original training dataset based on a predicate of one of the feedback decision rules.

4. The system of claim 3, wherein generating the updated training dataset further comprises applying the one feedback decision rule to the oversampled plurality of training instances.

5. The system of claim 1, wherein generating the updated training dataset comprises generating a plurality of instances based on one or more of the feedback decision rules, wherein the plurality of instances comprise a population identified by the one or more feedback decision rules.

6. The system of claim 1, wherein one of the feedback decision rule set is responsive to an explanation by the machine learning model for a prediction of an instance.

7. The system of claim 1, wherein the one of the feedback decision rules comprises a mapping between a predicate and a prediction class.

8. A computer-implemented method, comprising:
receiving a plurality of feedback decision rules for determining classifications of instances in an original training dataset for a plurality of predictions by a trained machine learning model;
generating a feedback rule set based on the plurality of feedback decision rules;
generating an updated feedback rule set by modifying one or more conflicting rules in the feedback rule set to ensure same record in the original training dataset do not map to different target classes;
generating an updated training dataset by applying the updated feedback rule set to the original training dataset; and
retraining the trained machine learning model using the updated training dataset to move a decision boundary in the trained machine learning model for future classification tasks.

9. The method of claim 8, wherein generating the updated training dataset comprises generating a plurality of updated training instances by applying one of the feedback decision rules to a training instance of the original training dataset.

10. The method of claim 8, wherein generating the updated training dataset comprises oversampling a plurality of training instances from the original training dataset based on a predicate of one of the feedback decision rules.

11. The method of claim 10, wherein generating the updated training dataset further comprises applying the one feedback decision rule to the oversampled plurality of training instances.

12. The method of claim 8, wherein generating the updated training dataset comprises generating a plurality of instances based on one or more of the feedback decision rules, wherein the plurality of instances comprise a population identified by the one or more feedback decision rules.

13. The method of claim 8, wherein one of the feedback decision rules is responsive to an explanation by the machine learning model for a prediction of an instance.

14. The method of claim 8, wherein one of the feedback decision rules comprises a mapping between a predicate and a prediction class.

15. A computer program product comprising one or more computer readable storage media, and program instructions collectively stored on the one or more computer readable storage media, the program instructions comprising instructions configured to cause one or more processors to perform a method comprising:
receiving a plurality of feedback decision rules for determining classifications of instances in an original training dataset for a plurality of predictions made by a trained machine learning model;
generating a feedback rule set based on the plurality of feedback decision rules;
generating an updated feedback rule set by modifying one or more conflicting rules in the feedback rule set to ensure same record in the original training dataset do not map to different target classes;
generating an updated training dataset by applying the updated feedback rule set to the original training dataset; and
retraining the trained machine learning model using the updated training dataset to move a decision boundary in the trained machine learning model for future classification tasks.

16. The computer program product of claim 15, wherein generating the updated training dataset comprises oversampling a plurality of training instances from the original training dataset based on a predicate of one of the feedback decision rules.

17. The computer program product of claim 16, wherein generating the updated training dataset further comprises applying the one feedback decision rule to the oversampled plurality of training instances.

18. The computer program product of claim 15, wherein generating the updated training dataset comprises generating a plurality of instances based on one or more of the feedback decision rules, wherein the plurality of instances comprise a population identified by the one or more feedback decision rules.

19. The computer program product of claim 15, wherein one of the feedback decision rules is responsive to an explanation by the machine learning model for a prediction of an instance.

20. The computer program product of claim 15, wherein one of the feedback decision rules comprises a mapping between a predicate and a prediction class.

* * * * *